No. 806,780. PATENTED DEC. 12, 1905.
J. DAIN.
MOWER.
APPLICATION FILED MAY 13, 1905.
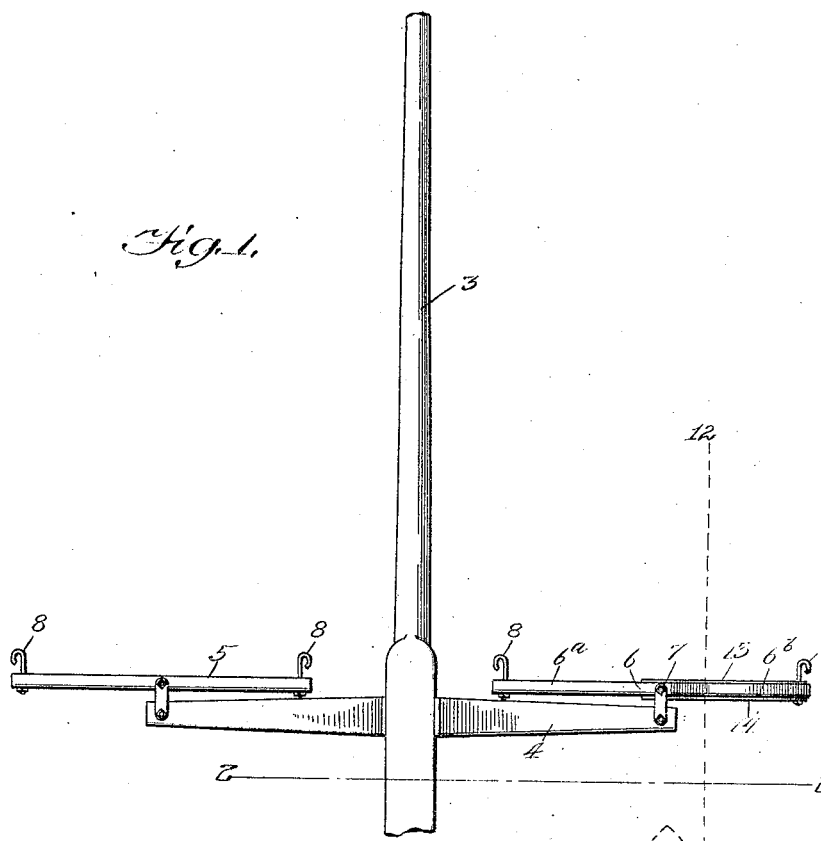
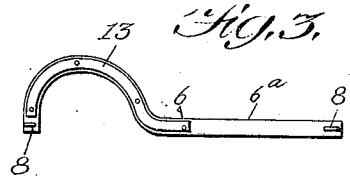
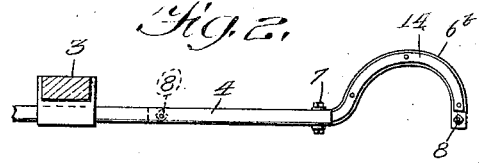

UNITED STATES PATENT OFFICE.

JOSEPH DAIN, OF OTTUMWA, IOWA.

MOWER.

No. 806,780.  Specification of Letters Patent.  Patented Dec. 12, 1905.

Application filed May 13, 1905. Serial No. 260,244.

*To all whom it may concern:*

Be it known that I, JOSEPH DAIN, a citizen of the United States, residing at Ottumwa, in the county of Wapello and State of Iowa, have invented certain new and useful Improvements in Mowers, of which the following is a specification, reference being had to the accompanying drawings.

My invention relates to mowers, and has for its object to provide means whereby the standing grass will not be pressed down in advance of the cutter-bar. As is well known to those familiar with the use of mowers, one of the whiffletrees necessarily projects to a greater or less extent over the standing grass in advance of the cutter-bar, with the result that if the grass is of any considerable length it is pressed down in front of the cutter-bar, so that when cut it falls forward instead of backward. It has been attempted to avoid this action by shortening one arm of the whiffletree so that it may not project so far over the standing grass; but this remedy is inefficient, as it is impossible to shorten the outer arm of the whiffletree sufficiently so that it will not project over the standing grass. Various other attempts have been made to overcome the difficulty, but so far as I am aware none of them have been successful. I have discovered, however, that it may be overcome by employing a whiffletree the outer arm of which is arched in a vertical plane, so that it projects over without coming in contact with the standing grass except at its extreme outer end, which, however, does not have a sufficiently extended surface to press down the grass.

By the term "arched in a vertical plane" it will be understood that I do not necessarily refer to a plane mathematically vertical, but to an arch so disposed as to avoid contact with the standing grass, as such arrangement falls within the scope of my invention.

In the drawings I have illustrated the application of my invention to a mower of ordinary type, only such parts of the mower being indicated as are necessary to convey a proper understanding thereof.

In said drawings, Figure 1 is a plan view. Fig. 2 is a rear view taken on line 2 2 of Fig. 1, and Fig. 3 is a front view of the arched whiffletree.

Referring to the drawings, 3 indicates the tongue of the mower, 4 a doubletree mounted thereon in any suitable way, and 5 6 whiffletrees. The whiffletree 5 may be of the usual form, and it may be connected with the doubletree in any desired way. The whiffletree 6, as illustrated, has a straight inner arm $6^a$ and an arched outer arm $6^b$, the arched arm commencing at about the pivot 7, which may be of any suitable type. In the best embodiment of the invention the arched portion $6^b$ is in a vertical plane and extends high enough to avoid contact with the standing grass. The ends of the whiffletree carry hooks 8 or are otherwise suitably arranged for the attachment of the usual draft devices. The part 9 (shown in dotted lines) indicates one of the wheels, the part 10 the cutter-bar, and the part 11 the inner shoe of the cutter-bar. The line 12 12 indicates the edge of the standing grass, which, it will be noted by an inspection of Fig. 1, is under the arched portion of the whiffletree 6. As illustrated in the drawings, the arched portion of the whiffletree is provided with one or more (preferably two) arched stiffening-plates 13 14, which are fixedly secured to the front and rear sides thereof.

Inasmuch as I believe myself to be the first in the art to provide a mower with a whiffletree having an arched arm arranged to extend over the standing grass in advance of the cutter-bar, I claim such construction broadly and do not limit myself to the arrangement shown except in so far as it is particularly claimed. The term "whiffletree" as herein employed is used to indicate the part through which the draft devices operate, whether it be technically a whiffletree or some other equivalent device.

That which I claim as my invention, and desire to secure by Letters Patent, is—

1. A mower, having a cutter-bar, and a draft connection having an upwardly-extending arched draft portion arranged to project over the standing grass in advance of the cutter-bar.

2. A mower, having a cutter-bar, and a whiffletree having an upwardly-extending arched arm arranged to extend over the standing grass in advance of the cutter-bar.

3. A mower, having a cutter-bar, a doubletree, and a whiffletree pivotally connected with said doubletree and having a vertically-arched portion extending over the standing grass in advance of the cutter-bar.

4. A mower, having a cutter-bar, a doubletree, a whiffletree pivotally connected with said doubletree and having a vertically-arched portion extending over the standing grass in advance of the cutter-bar, and a straight arm extending inwardly from said arched portion.

5. A whiffletree, having an upwardly-extending arched portion, the intermediate portion of the arch being higher than the end portions thereof.

6. A whiffletree, having a straight arm, and an arm arched in a vertical plane.

7. A whiffletree, having an upwardly-extending arched portion, the intermediate portion of the arch being higher than the end portions thereof, and a stiffening-plate at one side of said arched portion.

8. A whiffletree having an upwardly-extending arch at one side of the pivot thereof, the intermediate portion of the arch being higher than the end portions thereof.

JOSEPH DAIN.

Witnesses:
W. G. DUFFIELD,
J. D. BROWNING.